United States Patent Office 3,576,835
Patented Apr. 27, 1971

3,576,835
PREPARATION OF AROMATIC ISOCYANATES
Eric Smith, Madison, and Wilhelm Schnabel, Branford,
  Conn., assignors to Olin Corporation
No Drawing. Filed Dec. 18, 1967, Ser. No. 691,211
  Int. Cl. B01j 11/12; C07c 119/04
U.S. Cl. 260—453                                    14 Claims

ABSTRACT OF THE DISCLOSURE

The process for preparing an organic isocyanate by reacting an organic nitro compound with carbon monoxide in the presence of a catalyst system comprised of a mixture or complex of a nitrogen-containing heteroaromatic compound and a halide of a noble metal. The heteroaromatic nitrogen-containing compound is one containing between five and six members in the ring, containing no element other than nitrogen and carbon in the ring, containing no more than two nitrogen atoms in the ring, and having at least two double bonds in the ring. Pyridine and isoquinoline are the preferred heteroaromatic compounds. The noble metal halide is preferably a halide of palladium, rhodium, iridium, platinum, or mixtures thereof. The catalyst system may also include a third component such as molybdenum trioxide or another metal oxide.

---

This invention relates to catalytic systems useful in the preparation of organic isocyanates from organic nitro compounds.

Organic isocyanates are used extensively in the preparation of urethane foams, coatings, and fibers, as well as in the preparation of insecticides, pesticides and the like. Commercial processes for preparing organic isocyanates utilize the catalytic hydrogenation of an organic nitrocompound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Patent No. 1,025,436 discloses a process for preparing isocyanates from the corresponding nitro compounds by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems. For example, Belgian Patent No. 672,405 entitled "Process for the Preparation of Organic Isocyanates," describes the use of a catalyst system of a noble metal and/or a Lewis acid in the reaction between an organic nitro compound with carbon monoxide.

Unfortunately, the yield of organic isocaynate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and elevated temperature in the presence of a catalyst system comprised of
  (I) a mixture of
  (A) at least one heteroaromatic compound selected from the group consisting of
    (1) a heteroaromatic compound containing
      (a) between 5 and 6 members in the ring,
      (b) only nitrogen and carbon in the ring,
      (c) no more than two nitrogen atoms in the ring, and
      (d) at least two double bonds in the ring,
    (2) derivatives of (I) (A) (1), and
  (B) at least one halide of a noble metal, or
  (II) A complex of a compound of (I) (A) and a halide of (I) (B).

Certain metallic compounds promote the effectiveness of the catalyst system, including oxides of metals of Groups V–B and VI–B of the Periodic Table.

Any organic nitro compound capable of being converted to an organic isocyanate may be employed as a reactant. Generally, aromatic, cycloaliphatic, and aliphatic mono- or poly-nitro compounds, which may be substituted, if desired, can be reacted to form the corresponding mono- o poly-isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

(I) AROMATIC NITRO COMPOUNDS (a) Nitrobenzene
(b) Nitronaphthalenes
(c) Nitroanthracenes
(d) Nitrobiphenyls
(e) Bis(nitrophenyl)methanes
(f) Bis(nitrophenyl)ethers
(g) Bis(nitrophenyl)thioether
(h) Bis(nitrophenyl)sulfones
(i) Nitrodiphenoxy alkanes
(j) Nitrophenothiazines

(II) NITROCYCLOALKANES (a) Nitrocyclobutane
(b) Nitrocyclopentane
(c) Nitrocyclohexane
(d) Dinitrocyclohexanes
(e) Bis(nitrocyclohexyl)methanes

(III) NITROALKANES (a) Nitromethane
(b) Nitroethane
(c) Nitropropane
(d) Nitrobutanes
(e) Nitrohexanes
(f) Nitrooctanes
(g) Nitrooctadecanes
(h) Dinitroethane
(i) Dinitropropanes
(j) Dinitrobutanes
(k) Dinitrohexanes
(l) Dinitrodecanes
(m) Phenyl nitromethane
(n) Bromophenyl nitromethanes
(o) Nitrophenyl nitromethanes
(p) Methoxy phenyl nitromethanes
(q) Bis-(nitromethyl)cyclohexanes
(r) Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-organic nitro compounds which can be used are as follows:

(1) o-Nitrotoluene
(2) m-Nitrotoluene
(3) p-Nintrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4'-dinitrobiphenyl
(12) 2,4-dinitrobiphenyl
(13) 4,4'-dinitrodibenzyl
(14) Bis(p-nitrophenyl)methane
(15) Bis(2,4-dinitrophenyl)methane
(16) Bis(p-nitrophenyl)ether
(17) Bis(2,4-dinitrophenyl)ether
(18) Bis(p-nitrophenyl)thioether
(19) Bis(p-nitrophenyl)sulfone
(20) Bis(p-nitrophenoxy)ethane
(21) α,α'-dinitro-p-xylene
(22) 2,4,6-trinitrotoluene
(23) 1,3,5-trinitrobenzene
(24) 1-cholro-2-nitrobenzene
(25) 1-chloro-4-nitrobenzene
(26) 1-chloro-3-nitrobenzene
(27) 2-chloro-6-nitrotoluene
(28) 4-chloro-3-nitrotoluene
(29) 1-chloro-2,4-dinitrobenzene
(30) 1,4-dichloro-2-nitrobenzene
(31) alpha-Chloro-p-nitrotoluene
(32) 1,3,5-trichloro-2-nitrobenzene
(33) 1,3,5-trichloro-2,4-dinitrobenzene
(34) 1,2-dichloro-4-nitrobenzene
(35) alpha-Chloro-m-nitrotoluene
(36) 1,2,4-trichloro-5-nitrobenzene
(37) 1-bromo-4-nitrobenzene
(38) 1-bromo-2-nitrobenzene
(39) 1-bromo-3-nitrobenzene
(40) 1-bromo-2,4-dinitrobenzene
(41) α,α-Dibromo-p-nitrotoluene
(42) α-Bromo-p-nitrotoluene
(43) 1-fluoro-4-nitrobenzene
(44) 1-fluoro-2,4-dinitrobenzene
(45) 1-fluoro-2-nitrobenzene
(46) o-Nitrophenyl isocyanate
(47) m-Nitrophenyl isocyanate
(48) p-Nitrophenyl isocyanate
(49) o-Nitroanisole
(50) p-Nitroanisole
(51) p-Nitrophenetole
(52) o-Nitrophenetole
(53) 2,4-dinitrophenetole
(54) 2,4-dinitroanisole
(55) 1-chloro-2,4-dimethoxy-5-nitrobenzene
(56) 1,4-dimethoxy-2-nitrobenzene
(57) m-Nitrobenzaldehyde
(58) p-Nitrobenzaldehyde
(59) p-Nitrobenzoylchloride
(60) m-Nitrobenzoylchloride
(61) 3,5-dinitrobenzoylchloride
(62) Ethyl-p-nitrobenzoate
(63) Methyl-o-nitrobenzoate
(64) m-Nitrobenzenesulfonylchloride
(65) p-Nitrobenzenesulfonylchloride
(66) o-Nitrobenzenesulfonylchloride
(67) 4-chloro-3-nitrobenzenesulfonylchloride
(68) 2,4-dinitrobenzenesulfonylchloride
(69) 3-nitrophthalic anhydride
(70) p-Nitrobenzonitrile
(71) m-Nitrobenzonitrile
(72) 1,4-dinitrocyclohexane
(73) Bis(p-nitrocyclohexyl)methane
(74) 1-nitro-n-hexane
(75) 2,2-dimethyl-1-nitrobutane
(76) 1,6-dinitro-n-hexane
(77) 1,4-bis(nitromethyl)cyclohexane
(78) 3,3'-dimethoxy-4,4'-dinitro-biphenyl
(79) 3,3'-dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanate substituents, such as 2-isocyanato-4-nitrotoluene, may also be employed as a reactant.

The process of this invention is particularly effective in the conversion of aromatic nitro compounds to organic isocyanate. As used herein, the term "aromatic nitro compounds" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes both mono- and polynitro, including isomeric mixtures thereof; the nitroalkylbenzenes, including the various nitrated toluenes and the nitrated xylenes; nitrated biphenyl and nitrated diphenylmethylene. Other preferred reactants include bis(nitrophenoxy) alkylenes and bis(nitrophenoxy) alkyl ethers. Generally, the organic nitro compounds and substituted organic nitro compounds contain between 1 and about 20 carbon atoms, and preferably between about 6 and about 14 carbon atoms.

The catalyst system of this invention is a mixture or complex of at least one heteroaromatic nitrogen compound with at least one noble metal halide. The heteroaromatic nitrogen compound is one containing between five and six members in the ring, containing only nitrogen and carbon in the ring, containing no more than two nitrogen atoms in the ring, and containing at least two double bonds in the ring. Suitable compounds of this type disclosed in The Ring Index, by Patterson & Capell, Second Edition, American Chemical Society, 1960, and Supplements I, II and III. Derivatives of the heteroaromatic nitrogen compounds may also be utilized. The term "derivatives" when used in conjunction with heteroaromatic compounds throughout the description and claims is intended to include additions to the parent heteroaromatic nitrogen-containing ring of the following type:

(I) Substituents on the ring (a) halides such as chlorine, bromine, iodine and fluorine
    (b) alkyl containing between 1 and 40 carbon atoms
    (c) aryl such as phenyl, cresyl and xylyl
    (d) olefinc such as allyl, vinyl
    (e) hydroxy
    (f) mercapto
    (g) amino
    (h) alkylamino
    (i) cyano
    (j) oximino
    (k) aldehyde
    (l) ethers such as aryl, alkyl, and alkenyl ethers
    (m) thioethers such as aryl, alkyl, and alkenyl ethers
    (n) carboxy
    (o) carbalkoxy
    (p) carbamyl
    (q) carboaryloxy
    (r) thiocarbamyl (II) Polycyclic analogues (a) fused benzene
    (b) fused cycloaliphatic
    (c) fused nitrogen-containing heteroaromatic (III) Simple salts
(IV) Quaternary salts
(V) Oxides
(VI) Complexes with inorganic substances other than noble metal halides
(VII) Mixtures of two or more additions of types I–VI Listed below are typical heteroaromatic nitrogen compounds and derivatives thereof which are suitable for use as components of the novel catalyst system of this invention.

(1) Five membered ring containing one nitrogen (a) 1-methyl pyrrole
    (b) 1-phenyl pyrrole (2) Five membered ring containing two nitrogens (a) imidazole
    (b) 1-methyl imidazole
    (c) pyrazole (3) Fused benzene and fused nitrogen-containing heteroaromatic derivatives of five membered rings containing one nitrogen (a) indole
    (b) indolenine (3-psuedoindole)
    (c) 2-isobenzazole
    (d) indolizine
    (e) 4aH-carbazole
    (f) carbazole (4) Six membered ring containing one nitrogen and derivatives thereof (a) pyridine
    (b) 2,6-dimethylpyridine
    (c) 2,4,6-trimethylpyridine
    (d) 4-phenylpyridine
    (e) 2-vinylpyridine
    (f) 2-styrylpyridine
    (g) 2-bromopyridine
    (h) 2-chloropyridine
    (i) 3-chloropyridine
    (j) 2,6-dichloropyridine
    (k) 2-bromo-4-methpyridine
    (l) 2-fluoropyridine
    (m) 2-allyloxypyridine
    (n) 4-phenylthiopyridine
    (o) 2-methoxypyridine
    (p) picolinic acid
    (q) nicotinic acid
    (r) 2,6-dicyanopyridine
    (s) pyridine-2-aldehyde (picolinaldehyde)
    (t) 2-aminopyridine
    (u) 4-dimethylaminopyridine
    (v) diphenyl-4-pyridylmethane
    (w) 4-hydroxypyridine
    (x) 2-mercaptopyridine
    (y) 2-oximinopyridine (picolinaldoxime)
    (z) 4-tetiarybutylpyridine 5. Fused benzene and fused nitrogen-containing heteroaromatic derivatives of six membered ring containing one nitrogen (a) quinoline
    (b) 2-chloroquinoline
    (c) 8-hydroxyquinoline
    (d) isoquinoline
    (e) acridine
    (f) phenanthridine
    (g) 7,8-benzoquinoline
    (h) 4H-quinolizine
    (i) naphthyridine
    (j) carboline
    (k) phenanthroline
    (l) Benzo[h]isoquinoline
    (m) Benzoquinoline
    (n) Benzo[g]isoquinoline
    (o) Benzo[h]quinoline
    (p) Benzo[f]quinoline
    (q) Benzo[f]isoquinoline
    (r) 1H-Benzo[de]quinoline
    (s) 4H-Benzo[de]quinoline
    (t) 4H-Benzo[de]isoquinoline
    (u) 1H-Benzo[de]isoquinoline
    (v) purine
    (w) adenine
    (x) pteridine
    (y) 7H-pyrazino[2,3-c]carbazole
    (z) Pyrazino[2,3-d]pyridazine
    (aa) 4H-pyrido[2,3-c]carbazole
    (bb) Pyrido[1',2',:1,2]imidazo[4,5-b]quinoxaline
    (cc) 6H-permidine
    (dd) perimidine (6) Six membered ring containing two nitrogens and derivatives thereof (a) pyrazine
    (b) 4,6-dimethylpyrimidine
    (c) 2,6-dimethylpyrazine
    (d) pyridazine (7) Fused benzene and fused nitrogen-containing heteroaromatic derivatives of six membered rings containing two nitrogens (a) quinoxaline
    (b) 2,3-dimethylquinaxaline
    (c) phthalazine
    (d) quinazoline
    (e) phenazine
    (f) cinnoline (8) Simple salts of heteroaromatic nitrogen compounds or derivatives thereof in sections 1–7 above.

(a) Simple salts include nitrates, hydrohalides, sulfates and acetates of these compounds such as the following:

(1) pyridine hydrochloride
        (2) 2-chloropyridine-1-oxide hydrochloride
        (3) 4-chloropyridine hydrochloride
        (4) 4,4'-bipyridyl dihydrochloride (9) Quaternary salts of heteroaromatic nitrogen compounds or derivatives thereof of sections 2 and 4–7 above.

(a) Alkyl halides, where alkyl contains 1–40 carbon atoms, acyl halides, and nitroaryl halides, such as:
  (1) 1-methylquinolinum chloride
  (2) laurylpyridinium chloride
  (3) 1-(4-pyridyl)pyridinium chloride hydrochloride
(10) Oxides of heteroaromatic bases and derivatives thereof of sections 2 and 4–7 above.
  (a) Oxides include oxides of quinoline, pyridine, isoquinoline and imadazole, and are illustrated by the following oxides:
    (1) pyridine-1-oxide
    (2) 4-bromopyridine-1-oxide
    (3) 2-hydroxpyridine-1-oxide
    (4) picolinic acid-1-oxide
    (5) 4-methoxy pyridine-1-oxide
    (6) 2-bromo-6-methylpyridine-1-oxide
    (7) 2-picoline-1-oxide
    (8) 4-picoline-1-oxide
(11) Complexes of heteroaromatic nitrogen compounds with inorganic substances (other than noble metal halides) of sections 2 and 4–7 above.
  (a) Complexes include pyridine, quinoline and isoquinoline complexes illustrated by the following pyridine complexes:
    (1) (pyridine)$_3$·FeCl$_3$
    (2) pyridine·SO$_3$
    (3) pyridine·CrO$_3$
    (4) pyridine·VCl$_3$
    (5) pyridine·V$_2$O$_5$
    (6) pyridine·MoO$_3$ All of the foregoing heteroaromatic nitrogen compounds and derivatives thereof may be utilized as one component of the catalyst system along with the noble metal halide, either as a mixture or a complex. The complex is formed between the two components, as described more fully below. Typical complexes include the following:

(12) Complexes of a heteroaromatic nitrogen compound or derivatives thereof and a noble metal halide
  (a) Rh(pyridine)$_3$Cl$_3$
  (b) Pd(hyridine)$_2$Cl$_2$
  (c) Rh(isoquinoline)$_3$Cl$_3$
  (d) Pd(isoquinoline)$_2$Cl$_2$
  (e) Ir(pyridine)$_3$Cl$_3$
  (f) Ir(isoquinoline)$_3$Cl$_3$
  (g) Isoquinolinium chloropalladite ([isoquinoline]$_2$H$_2$PdCl$_4$)
  (h) Pd(isoquinoline)$_2$Cl$_4$
  (i) Pd(pyridine)$_2$Cl$_4$
  (j) Pd(pyridine)$_2$Br$_2$
  (k) Pd(isoquinoline)$_2$Br$_2$
  (l) Pd(pyridine)$_2$I$_2$
  (m) Pd(isoquinoline)$_2$I$_2$ The preferred complexes are Pd(pyridine)$_2$Cl$_2$, Pd(pyridine)$_2$Cl$_4$, Pd(isoquinoline)$_2$Cl$_4$, Pd(isoquinoline)$_2$Cl$_2$, Rh(pyridine)$_3$Cl$_3$ and Rh(Isoquinoline)$_3$Cl$_3$.

The second component of the catalyst system is at least one metal halide of a noble metal capable of forming a complex with the heteroaromatic nitrogen compound described above. Noble metals include ruthenium, rhodium, palladium, rhenium, osmium, iridium, platinum, silver and gold. It is preferred that the metal be one of the platinum series, including a metal halide selected from the group consisting of halides of palladium, rhodium, platinum, iridium and mixtures thereof. Typical examples of suitable halides include palladous dibromide, palladous dichloride, palladous difluoride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, rhenium trichloride, rhenium tetrachloride, rhenium tetrafluoride, rhenium hexafluoride, rhenium tribromide, iridium tribromide, iridium tetrabromide, iridium dichloride, iridium trichloride, iridium tetrachloride, iridium triiodide, iridium tetraiodide, and mixtures thereof. Preferred noble metal halides are selected from the group consisting of palladous dichloride, rhodium trichloride, iridium trichloride, rhenium trichloride, platinum tetrachloride and mixtures thereof, the more preferred noble metal halides being palladous dichloride and rhodium trichloride. Oxides of the noble metals may also be employed and the term "halide of a metal" is used throughout the description and claims is intended to include the above mentioned metal halides as well as the corresponding oxides, such as palladium oxide, rhodium oxide, platinum oxide, etc., and the like.

The heteroaromatic nitrogen compound and the metal halide may each be added separately to the organic nitro compound reactant, or if desired, may be premixed prior to adding to the organic nitro compound. When it is desired to utilize complexes of the heteroaromatic nitrogen compound and metal halide, the components may be first reacted in a suitable solvent such as moonchlorobenzene, ethanol, or an excess of the heterocyclic nitrogen compound to form an organic metal halide complex, which is then isolated as a crystalline solid and added to the reaction mixture. For example, isoquinoline may be reacted with palladous dichloride in anhydrous organic media to form a cis complex of the structural formula:

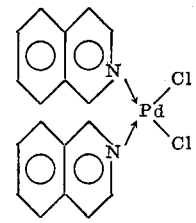

The corresponding trans complex may be prepared by reacting the heteroaromatic compound with an aqueous solution of a chloropalladite (formed by dissolving palladous dichloride in an aqueous solution of an inorganic halide, such as sodium chloride or ammonium chloride). The trans complex has the following structural formula:

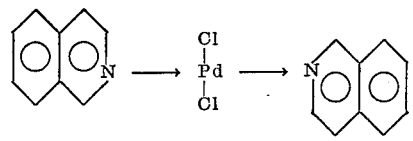

All other above specified heteroaromatic compounds may also be used to form corresponding organic metal halide complexes with the aforesaid metal halides for use as a catalyst in the invention. Cis and trans forms are each effective as a catalyst system in the process of this novel invention. These heteroaromatic complexes may be prepared in accordance with the procedure described above for the isoquinoline-palladous dichloride complex, including both the cis and trans forms. Other suitable complexes and other techniques for preparing the complexes of the heteroaromatic nitrogen compounnd and halides of a compound selected from the group consisting of palladium, rhodium, iridium and platinum are found in Advanced Inorganic Chemistry, by Cotten and Wilkinson, published by Interscience Publishers, 1962 as well as the following papers:

(1) "Inorganic Linkage Isomerism of the Thiocyanate Ion," by John L. Burmeister and Fred Basolo, Inorganic Chemistry, vol. 3, No 11, November 1964.

(2) "Synthesis and Infrared Study of Some Rhodium Coordination Compounds," by James P. Collman and Henry F. Holtzclaw, Jr., Journal of American Chemical Society, vol. 80, May 5, 1958, pp. 2054–2056.

(3) "Catalytic Approaches to Complex Compounds of Rhodium (III)," by R. D. Gillard, J. A. Osborn, and G. Wilkinson, Journal Chemical Society, pages 1951–1965, 1965.

(4) "The Action of Reducing Agents on Pyridine Complexes of Rhodium (III)," by B. N. Figgis, R. S. Nyholm, and G. Wilkinson, Journal Chemical Society, pages 5189–5193, 1964.

Although all of the aforesaid catalyst systems have some effect on improving the yield of isocyanate, certain systems are significantly more effective than others. Included in these more effective systems are mixtures and/or complexes of the metal halides with the following heteroaromatic compounds:

(1) 7,8-benzoquinoline
(2) 4-phenylpyridine
(3) 4-picoline-1-oxide
(4) 3-picoline-1-oxide
(5) 8-hydroxyquinoline
(6) Pyridine
(7) Quinoline
(8) Isoquinoline
(9) 3-chloropyridine
(10) Picolinic acid
(11) Imidazole
(12) Lauryl pyridinium chloride Pyridine and isoquinoline are particularly preferred heteroaromatic nitrogen compounds.

The catalyst system can be self-supported or deposited on a support or carrier for dispersing the catalyst system to increase its effective surface. Alumina, silica, carbon, barium sulfate, calcium carbonate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio of the heteroaromatic nitrogen compound to the anion of the noble metal halide is generally between about 0.1:1 and about 10:1, and preferably between about 0.5:1 and about 1.5:1, but greater or lesser ratios may be employed if desired.

The process of this invention operates effectively in the absence of a solvent, but improved overall yields of the organic isocyanates can be obtained when a solvent which is chemically inert to the components of the reaction system is employed. Suitable solvents include aliphatic cycloaliphatic and aromatic solvents such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which was previously urged with nitrogen, and which is preferably provided with agitation means such as a stirrer or an external rocking mechanism. At start-up, carbon monoxide is fed into the autoclave until a pressure is attained, at ambient temperature which is generally between about 30 and about 10,000 p.s.i.g. After the reaction proceeds and heat is applied, the pressure may increase to as high as 30,000 p.s.i.g. The preferred reaction pressure is between about 100 and about 20,000 p.s.i.g. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I) $R(NO_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide containing gas streams greatly reduces the overall consumption of carbon monoxide.

The reaction temperature is generally maintained above about 25° C. and preferably between about 100 and about 250° C. Interior and/or exterior heating and cooling means may be employed to maintain the temperature within the reactor within the desired range.

The reaction time is dependent upon the organic nitro compound being reacted, temperature, pressure, and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction may be much lower, i.e., substantially instantaneous, and residence time may be substantially less than batch reaction time.

The reaction can be carried out batchwise, semicontinuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers, and the like by reacting the organic isocyanate with a suitable polyether polyol in the presence of a catalyst and, if desired, a foaming agent. In addition, the organic isocyanates may be used in the preparation of biologically active compounds.

As stated previously, certain of the aforesaid catalyst systems are more effective than others. Somewhat variable results are obtained in situations in which two pyridine nuclei are joined together. Compounds of this type are unsatisfactory when used as a component of the catalyst system, if the configuration of the two nitrogens is such that after coordination with the noble-metal halide, a five-membered ring is formed. Compositions of this type which are unsatisfactory for use as a catalyst component include 2,2'-bipyridyl, 1,10-phenanthroline, 2,2'-biquinoline or 2-pyridinealdazine. However, in cases where a five-membered coordination complex ring cannot be formed with the organic metal halide, for example, compounds such as 2,2'-pyridil and 4,4'-bipyridyl hydrochloride, these compounds function satisfactorily as catalysts for the conversion of nitro compounds to isocyanates.

Some improvement in the conversion and yield of organic isocyanates can be obtained by employing a catalyst system which not only contains a mixture or complex of the aforesaid heterocyclic nitrogen-containing compound and metal halide, but also contains a third component comprised of certain metal oxides. Oxides suitable as a third component of the catalyst system include at least one oxide of an element selected from the group consisting of vanadium, molybdenum, tungsten, niobium, chromium and tantalum, as described in co-pending application Ser. No. 619,158, filed Feb. 28, 1967, for Process, by Wilhelm J. Schnabel, Ehrenfried H. Kober and Theodore C. Kraus. These elements are found in Groups V–B and VI–B of the Periodic Table. Suitable oxides of this type include chromic oxide ($CR_2O_3$), chromium dioxide ($CrO_2$), and chromous oxide ($CrO$); molybdenum sesquioxide ($Mo_2O_3$), molybdenum dioxide ($MoO_2$), and molybdenum trioxide ($MoO_3$); niobium monoxide ($NbO$), niobium oxide ($NbO_2$), and niobium pentoxide ($Nb_2O_5$); tantalum dioxide $Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$) and vanadium pentoxide ($V_2O_5$). Mixtures of two or more of these oxides may be employed as one component of the catalyst mixture. One of the preferred metal oxides is molybenum trioxide. The proportion of the third component of the catalyst system, when one is employed, is generally equivalent to a weight ratio of the Group VIII metal compound to the metal oxide in the catalyst system generally in the range between about 0.0001:1 and about 25:1, and preferably in the range between about 0.005:1 and about 5:1.

The following examples are presented to describe the invention more fully without any intention of being limited thereby. All parts and percentages are by weight unless otherwise specified.

Examples 1–5

In these examples, the procedure included charging 2,4-dinitrotoluene (5-0 grams) and a catalyst mixture of palladous dichloride (0.4 gram, $2.26 \times 10^{-3}$ moles) and the co-catalyst indicated in the table ($4.52 \times 10^{-3}$ moles) to a clean, 100 ml. stainless steel autoclave (316 grade) together with orthodichlorobenzene solvent (5 ml.).

The autoclave was sealed after being so charged, then pressured with nitrogen and tested for leaks. Nitrogen was released and the autoclave was pressured with carbon monoxide to about 2500 p.s.i.g. During the reaction the autoclave was rocked in a rocker (36 cycles per minute), and heated during one hour at 190° C., when the internal pressure rose to about 3800 p.s.i.g. This temperature was maintained for three hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solutions were combined with the filtrate and the resulting solution was subjected to a determination of its infrared spectrum to test for the presence of isocyanates (which possess a characteristic infrared light absorption at about 4.5 microns). The filtrate was also subjected to analysis by vapor phase chromatography, to determine the weight percentage of 2,4-dinitrotoluene, 2,4-toluene diisocyanate, 2-isocyanato-4-nitrotoluene and 4-isocyanato-2-nitrotoluene present. The conversion of 2,4-dinitrotoluene was calculated. The yield of 2,4-toluene diisocyanate and the combined yield of mononitrotolyl isocyanates was calculated and then corrected for the amount of 2,4-dinitrotoluene, if any, which had been recovered.

| Cocatalyst | Percent conversion | Percent yield TDI [1] | TP [2] |
|---|---|---|---|
| Example: | | | |
| 1 ......... Pyridine, 0.36 g............ | 89 | 20 | 60 |
| 2 ......... Isoquinoline, 0.58 g........ | 85 | 28 | 60 |
| 3 ......... 3-chlorophridine, 0.51 g.... | 94 | 12 | 46 |
| 4 ......... 3-picoline-1-oxide, 0.49 g... | 96 | 21 | 49 |
| 5 ......... Lauryl pyridinium chloride, 0.48 g. | 100 | 14 | 42 |

[1] 2,4-toluene diisocyanate.
[2] Total isocyanate product, including monoisocyanatomononitro compounds.

Examples 6–8

The procedure of Examples 1–5 was repeated except that the organic nitrocompound was 2,6-dinitrolene (3.0 grams) and the catalyst system complex listed below in the table in the proportion of 12 percent by weight of the nitro compound.

| Catalyst complex | Percent conversion | Percent Yield 2,6-TDI | TP |
|---|---|---|---|
| Example: | | | |
| 6 ......... Pd (pyridine)$_2$Cl$_2$ .......... | 92.2 | 30.8 | 81.4 |
| 7 ......... Pd (pyridine)$_2$Cl$_4$ .......... | 90.1 | 27.1 | 75.9 |
| 8 ......... Pd (Isoquinoline)$_2$Cl$_2$ ..... | 89.4 | 30.5 | 85.7 |

For purposes of comparison a procedure similar to above was employed except that the catalyst was solely $PdCl_2$ or solely $RhCl_3$. Only a trace of isocyanate could be detected in each instance.

Examples 9–11

A 300 milliliter stainless steel autoclave provided with a mechanically driven agitator, internal cooling coils, and an external heating mantle was employed in these examples. A solution of 10 grams of 2,4-dinitrotoluene in 125 grams of ortho-dichlorobenzene was added to the autoclave along with the catalyst mixture recited below in the table. Each reaction was carried out at a temperature of about 200° C., with agitation, for approximately 3 hours and 20 minutes. The pressure was maintained at approximately 1000 p.s.i.g. with carbon monoxide. The feed rate of carbon monoxide through a sparger in the autoclave was about one liter per minute.

| Catalyst system | Percent conversion | Percent Yield 2,4-TDI | TP |
|---|---|---|---|
| Example: | | | |
| 9 ......... PdCl$_2$: isoquinoline (1:5 g). | 100 | 65 | 65 |
| 10 ........ PdCl$_2$: isoquinoline: RhCl$_3$MoO$_3$(1:5:0.5:1 g).. | 100 | 58 | 66 |
| 11 [1] .... PdCl$_2$: isoquinoline: MoO$_3$(1:1:0.1 g.). | 100 | 57 | 65 |

[1] Pressure was 1,500 p.s.i.g.

Examples 12–13

Using apparatus similar to Examples 9–11, but having a volume of about two liters, a solution of 30 grams of dinitrotoluene in 375 grams of ortho-dichlorobenzene was fed to the reactor. A palladous dichloride pyridine complex in the proportion recited below in the table was added to the solution, the reactor was closed and pressurized with carbon monoxide to an initial pressure of 8500 p.s.i.g. The reactor was heated to a temperature of 190° C. for 90 minutes with agitation at a speed of 1000 r.p.m. The pressure increased to about 15,600 p.s.i.g. during the reaction. Analysis of the product is presented below in the table:

| Example | Catalyst weight, grams | Percent conversion | Percent yield 2,4-TDI | TP |
|---|---|---|---|---|
| 12 ....................... | 6 | 92 | 32 | 58 |
| 13 ....................... | 12 | 100 | 68 | 68 |

Examples 14–84

Utilizing the procedure of Examples 1–5 or 9–11, the following heteroaromatic nitrogen compound or derivative thereof was utilized as a component of a catalyst system with a halide of a noble metal either as a mixture or complex thereof. Significant conversion of the organic nitro-compound and/or yield of organic isocyanate was obtained in each instance. Palladous dichloride was the noble metal halide employed with the co-catalyst unless another noble metal halide is recited. The proportion of noble metal halide is 0.4 gram, unless another proportion is recited.

| Example: | Co-catalyst or catalyst |
|---|---|
| 14 | 2-bromopyridine. |
| 15 | 2-chloropyridine-($RhCl_3$). |
| 16 | 2,6-dichloropyridine-($RhCl_3$). |
| 17 | Nicotinic acid-($RhCl_3$). |
| 18 | 2-chloroquinoline-($RhCl_3$). |
| 19 | 3-chloropyridine-($RhCl_3$). |
| 20 | 2-bromopyridine-($RhCl_3$). |
| 21 | Quinoxaline-($RhCl_3$). |
| 22 | Picolinaldehyde-($RhCl_3$). |
| 23 | Pyridine-1-oxide. |
| 24 | 1-methylimidazole. |
| 25 | Pyridinium hydrochloride. |
| 26 | Phthalazine. |
| 27 | Imidazole. |
| 28 | Quinoline. |
| 29 | Pyridine, $PtCl_4$, $RhCl_3$. |
| 30 | 4-dimethylaminopyridine. |
| 31 | 4-phenylpyridine. |
| 32 | 4-picoline-1-oxide. |
| 33 | 8-hydroxyquinoline. |
| 34 | 7,8-benzoquinoline. |
| 35 | 2-vinylpyridine. |
| 36 | Pyridine-$SO_3$ complex. |
| 37 | 2-bromo-methylpyridine-1-oxide. |
| 38 | 2-chloroquinoline. |
| 39 | 2,6-lutidine. |
| 40 | Picolinic acid. |
| 41 | 2-chloropyridine-N-oxide hydrochloride. |
| 42 | 1-methylquinolinium chloride. |
| 43 | Acridine. |
| 44 | 4-t-butylpyridine. |
| 45 | 2-aminopyridine. |
| 46 | 4-hydroxypyridine. |
| 47 | 2,2′-pyridil. |
| 48 | $RhCl_3$/phenanthridine. |
| 49 | $RhCl_3$/pyridazine. |
| 50 | $RhCl_3$/vinylpyridine. |
| 51 | 2-chloropyridine-N-oxide. |
| 52 | 2-pyridinealdoxime. |
| 53 | 2-stilbazole. |
| 54 | 1-phenylpyrrole. |
| 55 | 1-(4-pyridyl) pyridinium chloride hydrochloride. |
| 56 | 2-bromo-4-methylpyridine. |
| 57 | Pyrazole. |
| 58 | 4-chloropyridine hydrochloride. |
| 59 | 2,6-pyridinedicarboxylic acid. |
| 60 | $RhCl_3$/2-bromopyridine. |
| 61 | $RhCl_3$/2-chloroquinoline. |
| 62 | 2,6-dicyanopyridine. |
| 63 | $RhCl_3$/pyridine-$SO_3$. |
| 64 | 4-vinyl pyridine. |
| 65 | diphenyl-4-pyridyl methane. |
| 66 | Methyl isonicotinate. |
| 67 | Bis(pyridine)chromium oxide. |
| 68 | Picolinic acid-1-oxide. |
| 69 | $PdCl_2$—1 mole/8-hydroxyquinoline—2 moles. |
| 70 | Pyridine-iridium trichloride. |
| 71 | Pyridine-rhenium trichloride. |
| 72 | Isoquinoline-iridium trichloride. |
| 73 | Isoquinoline-rhenium trichloride. |
| 74 | Pd (pyridine)$_2Cl_2$+$V_2O_5$. |
| 75 | Pd (pyridine)$_2Cl_2$ impregnated on carbon (16:84). |
| 76 | Picolinaldehyde. |
| 76a | Pd (pyridine)$_2Cl_2$+$MoO_2$. |
| 77 | 2-chloropyridine. |
| 78 | S-collidine. |
| 79 | 2-fluoropyridine. |
| 80 | 2,6-dimethylpyrazine. |
| 81 | Pd (pyridine)$_2Br_2$. |
| 82 | Pd (isoquinoline)$_2Br_2$. |
| 83 | Pd (pyridine)$_2I_2$. |
| 84 | Pd (isoquinoline)$_2I_2$. |

Examples 85–86

The procedure of Examples 1–5 was repeated with the exception that the organic nitrocompound was either 4-monoisocyanato-2-mononitrotoluene or 2-monoisocyanato-4-mononitrotoluene. Significant conversion and yields of 2,4-toluene diisocyanate were obtained.

Various modifications of the invention may be employed, some of which have been referred to above, without departing from the spirit of the invention.

What is desired to be secured by Letters Patent is:

1. In the process for preparing an aromatic isocyanate by reacting an aromatic nitro compound containing up to about 20 carbon atoms with carbon monoxide at an elevated temperature and an elevated pressure in the presence of a catalyst, the improvement which comprises employing as said catalyst, a catalytic proportion of a catalyst system comprised of
   (I) a mixture of
      (A) a heteroaromatic nitrogen compound selected from the group consisting of
         (1) a heteroaromatic nitrogen compound having a ring containing
            (a) between 5 and 6 members,
            (b) only nitrogen and carbon,
            (c) no more than two nitrogen atoms, and
            (d) at least two double bonds,
         (2) derivatives of (I)(A)(1), with the provision that when said derivative is formed by a nitrogen-containing addition to said heteroaromatic nitrogen compound, said derivative will form with a noble metal halide a coordination complex ring which does not contain five members, and
      (B) a noble metal compound selected from the group consisting of noble metal halides and noble metal oxides, or
   (II) a complex of a compound of (I)(A) and a noble metal compound of (I)(B),
   (III) wherein the molar ratio of said heteroaromatic nitrogen compound to the anion of said noble metal compound in said catalyst system is in the range between about 0.1:1 and about 10:1, and
   (IV) wherein the noble metal of said noble metal compound is selected from the group consisting of palladium, rhodium, iridium, platinum, rhenium, ruthenium and mixtures thereof.

2. The process of claim 1 wherein the proportion of said catalyst system is between about 0.001 and about 500 percent by weight of said aromatic nitro compound.

3. The process of claim 2 wherein said heteroaromatic nitrogen compound is selected from the group consisting of
   (a) 7,8-benzoquinoline
   (b) 4-phenylpyridine (c) 4-picoline-1-oxide
(d) 3-picoline-1-oxide
(e) 8-hydroxyquinoline
(f) pyridine
(g) quinoline
(h) isoquinoline
(i) 3-chloropyridine
(j) picolinic acid
(k) imidazole
(l) lauryl pyridinium chloride.

4. The process of claim 3 wherein said noble metal compound is selected from the group consisting of palladous dichloride, rhodium trichloride, iridium trichloride rhenium trichloride, platinum tetrachloride and mixtures thereof.

5. The process of claim 4 wherein said catalyst system contains a third component comprised of an oxide of a metal selected from the group consisting of vanadium, molybdenum, tungsten, niobium, chromium and tantalum.

6. The process of claim 5 wherein said aromatic nitro compound is selected from the group consisting of nitrobenzene, dinitrotoluene and monoisocyanato-mononitrotoluene.

7. The process of claim 6 wherein said metal oxide is selected from the group consisting of chromic oxide ($Cr_2O_3$), chromium dioxide ($CrO_2$), chromous oxide (CrO), molybdenum sesquioxide ($Mo_2O_3$), molybdenum dioxide ($MoO_2$), molybdenum trioxide ($MoO_3$), niobium monoxide (NbO), niobium oxide ($NbO_2$), niobium pentoxide ($Nb_2O_5$), tantalum dioxide ($Ta_2O_2$), tantalum tetraoxide ($Ta_2O_4$), tantalum pentoxide ($Ta_2O_5$), tungstic oxide ($WO_2$), tungstic trioxide ($WO_3$), vanadium dioxide ($V_2O_2$), vanadium trioxide ($V_2O_3$), vanadium tetraoxide ($V_2O_4$), vanadium pentoxide ($V_2O_5$) and mixtures thereof.

8. The process of claim 4 wherein said heteroaromatic nitrogen compound is selected from the group consisting of pyridine and isoquinoline.

9. The process of claim 8 wherein said noble metal compound is selected from the group consisting of palladous dichloride and rhodium trichloride.

10. The process of claim 9 wherein said aromatic nitro compound is selected from the group consisting of nitrobenzene, dinitrotoluene and monoisocyanato-mononitrotoluene.

11. The process of claim 10 wherein said catalyst system is a complex having a structural formula selected from the group consisting of $Pd(pyridine)_2Cl_2$, $Pd(pyridine)_2Cl_4$, $Pd(isoquinoline)_2Cl_4$, $Pd(isoquinoline)_2Cl_2$, $Rh(pyridine)_3Cl_3$ and $Rh(isoquinoline)_3Cl_3$.

12. The process of claim 11 wherein the proportion of said catalyst system is between about 1 and about 100 percent by weight of said aromatic nitro compound.

13. The process of claim 12 wherein said catalyst system contains a third component comprised of an oxide of a metal selected from the group consisting of vanadium, molybdenum, tungsten, niobium, chromium and tantalum.

14. The process of claim 13 wherein said oxide of a metal is molybdenum trioxide.

References Cited

UNITED STATES PATENTS 3,405,156  10/1968  Stern et al. _____ 260—453

FOREIGN PATENTS 672,405  5/1966  Belgium.

CHARLES B. PARKER, Primary Examiner

D. H. TORRENCE, Assistant Examiner

U.S. Cl. X.R.

252—429; 260—250, 251, 252, 283, 286, 289, 290, 294.8, 294.9, 295, 296, 297, 309, 310, 311, 313.1, 315, 319.1